(12) United States Patent
Joublin et al.

(10) Patent No.: US 8,631,160 B2
(45) Date of Patent: Jan. 14, 2014

(54) DEVELOPMENT OF PARALLEL/DISTRIBUTED APPLICATIONS

(75) Inventors: Frank Joublin, Mainhausen (DE); Christian Goerick, Seligenstadt (DE); Antonello Ceravola, Frankfurt am Main (DE); Mark Dunn, Mühlheim (DE)

(73) Assignee: Honda Research Institute Europe GmbH, Offenbach/Main (DE)

( * ) Notice: Subject to any disclaimer, the term of this patent is extended or adjusted under 35 U.S.C. 154(b) by 2149 days.

(21) Appl. No.: 11/429,383

(22) Filed: May 4, 2006

(65) Prior Publication Data

US 2006/0277323 A1 Dec. 7, 2006

(30) Foreign Application Priority Data

May 30, 2005 (EP) .................................. 05011616

(51) Int. Cl.
    *G06F 15/16* (2006.01)
(52) U.S. Cl.
    USPC ........... 709/248; 712/220; 712/227; 718/100; 718/102; 718/106; 718/107
(58) Field of Classification Search
    USPC .................. 718/100, 106, 102, 107; 709/248; 712/220, 227
    See application file for complete search history.

(56) References Cited

U.S. PATENT DOCUMENTS

| 5,237,691 | A | 8/1993 | Robinson et al. |
| 5,758,345 | A * | 5/1998 | Wang .......................... 707/100 |
| 5,999,729 | A | 12/1999 | Tabloski, Jr. et al. |
| 6,311,265 | B1 * | 10/2001 | Beckerle et al. .............. 712/203 |
| 7,076,332 | B2 * | 7/2006 | Cifra et al. ..................... 700/245 |
| 2002/0120601 | A1 * | 8/2002 | Elmendorf et al. ............... 707/1 |
| 2005/0097561 | A1 * | 5/2005 | Schumacher et al. ........ 718/106 |
| 2007/0271562 | A1 * | 11/2007 | Schumacher et al. ........ 718/100 |

FOREIGN PATENT DOCUMENTS

| EP | 0780763 A1 | 6/1997 |
| EP | 1026587 A2 | 8/2000 |

\* cited by examiner

*Primary Examiner* — Asad Nawaz
*Assistant Examiner* — Najeebuddin Ansari
(74) *Attorney, Agent, or Firm* — Fenwick & West LLP

(57) ABSTRACT

One embodiment of the present invention provides a method for supporting the development of a parallel/distributed application, wherein the development process comprises a design phase, an implementation phase and a test phase. A script language can be provided in the design phase for representing elements of a connectivity graph and the connectivity between them. In the implementation phase, modules can be provided for implementing functionality of the application, executors can be provided for defining a type of execution for the modules, and process-instances can be provided for distributing the application over several computing devices. In the test phase, abstraction levels can be provided for monitoring and testing the application.

25 Claims, 7 Drawing Sheets

DEVELOPMENT OF PARALLEL/DISTRIBUTED APPLICATIONS

CROSS-REFERENCE TO RELATED APPLICATIONS

This application is related to and claims priority from European Patent Application No. 05 011 616.9 filed on May 30, 2005, which is incorporated by reference herein in its entirety.

FIELD OF THE INVENTION

The present invention relates to the field of developing a parallel/distributed application.

BACKGROUND OF THE INVENTION

Parallel/distributed applications can be composed of several functions running in parallel and interacting with each other in order to perform a defined task. The design of such complex systems requires effort especially concerning handling of the integrity of system behavior and the definition of a protocol for interaction between parallel tasks. Interactions between tasks must be synchronized in order to handle data integrity. Moreover, communication between machines has to be performed using network protocols and in a synchronized manner in the network.

The development of parallel/distributed applications can be set up in several ways and supported by conventional tools. A conventional process followed in the development of such applications or systems is shown in FIG. 9.

A process for developing parallel/distributed applications may have cycles or may iterate during the development of the system. The development may continue during the life of the system. Requirements of the design phase can include definition of global functions of the system, subdivision of the system into parallel sub-tasks, definition of critical conditions that may occur in sub-process interaction, and analysis of dangerous conditions such as deadlock. Requirements of the development phase can include handling of parallel processes, handling of parallel threads, handling of shared data, and handling of semaphores, lock mechanisms and conditional variables. Requirements of a test/monitoring phase can include definition of mechanisms that allow users to understand system behavior in order to solve problems or find and remove bugs in the system.

Part of the development/debugging time can be saved depending on the type of libraries used. Libraries like PTHREAD can be used for the handling of threads and the most general lock mechanisms for synchronization. See David R. Butenhof. Programming with POSIX Threads, Addison Wesley Publishing, 2000, which is incorporated by reference herein in its entirety. The usage of such a library requires deep knowledge of parallel programming. Further, applications developed with this library are prone to errors. Other libraries, such as ACE, PVM and MPI, also attempt to solve the problems related to parallel execution and data exchange in parallel/distributed computing. See Douglas C. Schmid and Stephen D. Houston, C++ Network Programming, volume Vol. 1: Master Complexity with ACE and Patterns, Addison Wesley Publishing, 2002; Al Geist, Adam Beguelin, Jack Dongarra, Weicheng Jiang, Robert Manchek, Vaidy Sunderam, PVM: Parallel Virtual Machine, A Users' Guide and Tutorial for Networked Parallel Computing, MIT Press, Cambridge, Mass., USA, 1994; Marc Snir, Steve Otto, Steven Huss-Lederman, David Walker and Jack Dongarra, MPI: The complete reference, MIT Press, Cambridge, Mass., USA, http://www.netlib.org/utk/papers/rnpi-book.html, 1996, which are all incorporated by reference herein in their entirety. Although these libraries address issues of parallel programming, they still leave a certain amount of work to the user. Moreover, the usage of such libraries does not enforce modularization or clear design, leaving these aspects to the responsibility of the user.

Another way of supporting the development of parallel/distributed applications is provided by tools such as Rhapsody or Rational Rose. See http://www.ilogix.com; Wendy Boggs, Michael Boggs, Mastering UML with Rational Rose 2.0, Sybex Books, 2002, which are all incorporated by reference herein in their entirety. These tools employ a modular approach and a more comprehensive design by the usage of Unified Modeling Language (hereinafter "UML"). However, these tools leave to the user the definition and implementation of many important aspects, for example communication, parallel processing and synchronization. Their goal is to include a programming language in an integrated development environment that can cover the design, coding and test phases, while still leaving a large degree of freedom to the user.

Another tool that covers the design phase and the development phase with a modular approach (partitioning of data and computation) is ControlShell. See Real-Time Innovation, ControlShell User's Manual, Version 7.0, Real-Time Innovation Inc., California, 2001, which is incorporated by reference herein in its entirety. With this tool it is possible to design and develop applications at the same time by the composition of several types of modules. This tool is able to handle parallel/distributed applications, but since it has been designed specifically for control systems, the handling of the modules is under the control of sample-rate units that control the module's execution directly (synchronous mode) or indirectly through a state machine (asynchronous mode). Moreover, handling of data synchronization between threads is left to the user.

SUMMARY OF THE INVENTION

One embodiment of the present invention provides a method for supporting the development of a parallel/distributed application, wherein the development process comprises a design phase, an implementation phase and a test phase, and wherein the method comprises providing, in the design phase, a script language for representing elements of a connectivity graph and the connectivity between them; providing, in the implementation phase, modules that can be predefined for implementing functionality of the application; providing, in the implementation phase, executors that can be predefined for defining a type of execution for the modules; providing, in the implementation phase, process-instances that can be predefined for distributing the application over several computing devices; and providing, in the test phase, abstraction levels that can be predefined for monitoring and testing the application in the test phase.

One embodiment of the present invention provides a computer-implemented method for developing a parallel/distributed application, comprising a design phase, an implementation phase and a test phase, the method comprising representing one or more elements of a connectivity graph and connectivity between the one or more elements using a script language in the design phase; implementing functionality of the application in the implementation phase using one or more modules that can be predefined; defining a type of execution for the modules in the implementation phase using executors that can be predefined; distributing the application over one or more computing devices in the implementation phase using one or more process-instances that can be predefined; and monitoring and testing the application in the test phase using one or more abstraction levels that can be predefined.

Example applications of the techniques presented herein include setting up control systems for humanoid robots or other actors, such as an automatically guided vehicle, in which input signals of differing nature are processed in a parallel fashion in order to control behavior of the actor. One embodiment of the present invention provides improved support for the design, creation and testing of parallel/distributed applications. One embodiment of the present invention supports the design, creation and testing of data-driven parallel/distributed applications. One embodiment of the present invention simplifies the development process for parallel/distributed applications. One embodiment of the present invention enables efficient development of parallel/distributed applications that are robust and reliable.

One embodiment of the present invention comprises processing, in the implementation phase, the connectivity graph as represented based on the script language to define and configure particular modules based on the predefined modules and to define the connectivity of the particular modules.

The predefined modules can comprise computing modules for implementing functional blocks as part of the computation of the parallel/distributed application. The computing modules may each have an interface to input data, output data, input events, output events and initialization parameters. Passive computing modules can also be provided, which perform computations in case new input data is available.

The predefined modules can further comprise data modules representing data that is used by the computing modules and/or is exchanged between the computing modules. The data modules may represent shared data and each data module may contain data of a specific data type. Each data module can have an interface comprising an input gate, output fields and initialization parameters. According to one embodiment of the present invention, data requiring synchronization is identified and an appropriate synchronization mechanism is applied for each data module. Resource synchronization is an operation that enables parallel systems to share common resources. Each data module may instantiate a list of buffers providing write or read memory for the connected computing module/s.

The predefined modules can also comprise link modules representing the connectivity pattern connecting computing modules and/or data modules. Each link module can implement a specific communication protocol. Each link module may relate to one link type out of the group of link types comprising local memory pointer link for linking modules belonging to a common process, and network link for linking modules via a network.

According to one embodiment of the present invention, each computing module may be assigned to one executor. According to one embodiment, an executor may group a set of computing modules in one or more threads. Each executor may also represent a pattern of execution for the assigned modules. An executor may relate to one type of execution pattern out of the group of patterns comprising parallel execution wherein each module has its own thread, sequential execution wherein all modules are executed sequentially in the same thread, and one step execution wherein only one step of execution of all modules is performed. The group of execution patterns may further comprise chain execution wherein all computing modules of a thread are executed sequentially depending on the availability of data for the first module in the chain, and step-by-step execution wherein one computing module at a time is executed.

According to one embodiment of the present invention, a process-instance comprises an assignment of modules to a process. According to one embodiment, each computing module can be assigned to one process-instance. One embodiment of the present invention comprises grouping, in the implementation phase, a set of executors into a single process as one process-instance.

According to one embodiment of the present invention, a predefined module comprises a monitoring code for monitoring the functionality implemented by the module, for example in a test phase. According to one embodiment, a predefined abstraction level comprises a functionality level wherein at least one module generates monitoring data related to a functionality of the module. According to one embodiment, a predefined abstraction level may additionally or alternatively comprise a module level, where the input and output of at least one module is monitored in order to analyze the data flow related to that module. According to one embodiment, a predefined abstraction level may additionally or alternatively comprise a system level for monitoring the entire application. According to one embodiment of the present invention, a script language is used during execution to execute the application.

One embodiment of the present invention provides a computer-implemented method for supporting the development of a parallel/distributed application, wherein the development process comprises a design phase, an implementation phase and a test phase, and wherein the method comprises providing, in the design phase, a script language for representing elements of a connectivity graph and the connectivity between the elements; providing, in the implementation phase, computing modules, data modules and link modules for implementing the functionality of the application, wherein the modules and their connectivity are automatically generated from the connectivity graph as represented based on the script language; and providing, in the test phase, predefined abstraction levels for monitoring and testing the application.

One embodiment of the present invention introduces a new layer between an operating system and a user application, which provides an innovative approach towards the development of parallel/distributed systems. Conventional techniques for development of parallel/distributed systems require a designer/developer to handle many complex functionalities manually. According to one embodiment of the present invention, many of these complex functionalities can be automatically handled by the new layer.

Under conventional approaches, the granularity at which a user must handle parallel/distributed systems is at the application level. According to one embodiment of the present invention, the granularity is at module level, i.e. at the level of a functionality, a data structure or a data communication method. One embodiment of the present invention simplifies one or more phases in the development of a parallel/distributed system because much more attention can be spent on elements of the system, also referred to as modules herein, and less attention needs to be spent on integration issues, which are handled automatically. Under conventional approaches, a user must define or use a design process that may need to be kept synchronized with the development phases; according to one embodiment of the present invention, the design is part of the implementation of the system.

Therefore, one embodiment of the present invention provides a new, efficient approach for design and development of large-scale parallel systems.

One embodiment of the present invention supports and simplifies the design, creation and test of parallel/distributed data-driven applications, achieved amongst others by the provision of predefined modules, namely Computing Modules, Data Modules and Link Modules with well defined properties.

According to one embodiment of the present invention, computing modules are objects that may perform a general or a specific functionality, wherein each computing module can be associated with an executor that defines a type of execution, such as parallel, sequential, or once. According to one embodiment of the present invention, data modules represent memory space used to pass information from a source computing module to a destination computing module. According to one embodiment of the present invention, link modules are objects that define the connectivity between computing modules and data modules. Each Link Module can be associated with a specific communication protocol that determines the channel that needs to be used in the communication. According to one embodiment of the present invention, synchronization between modules and machine-to-machine communication is handled automatically for distributed applications developed using the techniques described herein. One embodiment of the present invention can be used for development of parallel systems, robot applications and real-time systems, which should satisfy explicit (bounded) response-time constraints to avoid severe failure situations. Examples of real-time systems include a watch, a washing-machine and a robot.

One embodiment of the present invention provides for a tight coupling of the design and implementation of a parallel/distributed system. According to one embodiment of the present invention, the design of a system is defined by a connectivity graph that can describe the system in all its parts. A script language is provided that allows one-to-one mapping of elements of the connectivity graph. Therefore, the application can be described by using the script language. According to one embodiment, the script language is a kind of high-level language that describes modules and connectivity between them. A graphical tool that creates and visualizes the design of parallel/distributed systems may use this language for an internal representation of the design. According to one embodiment, the script language can also be used by a running system in order to execute it. In order to be able to achieve both goals, the script language is both simple and flexible.

According to one embodiment of the present invention, a system can be designed by representing it with a number of functional blocks interconnected in a complex fashion by arrows. This type of representation is highly modular and allows quick insights into structure and properties of an application. Employing this abstraction level enables efficient creation of modular systems. According to one embodiment, functional blocks can be mapped to computing modules, wherein the connections between them are represented by Link Modules. The data that flows through connections, i.e. the communication between functionalities is represented by data modules, which identify the type of data that flows through arrows of a graph.

Parallel/distributed systems typically rely on heavy resource usage in terms of CPU-power, memory space and network communication capabilities. Efficient use of CPU-power can be achieved by employing operating system processes and threads. One embodiment of the present invention provides techniques to handle parallelism by introducing the concepts of executors and process-instances, which handle the assignment of functionalities to threads and processes.

According to one embodiment, each computing module may belong to one executor and one process-instance. Executors can hide the handling of threads while process-instances can hide the handling of operating system processes. There may be several types of executors, including parallel executors wherein each module has its own thread; sequential executors wherein one or more modules are executed sequentially in the same thread; and once executors wherein only one step of the execution of all modules is performed. According to one embodiment of the present invention, a computing module has internally defined one cycle of its computation that makes executors able to control threads.

According to one embodiment of the present invention, process-instances define groups, thus determining which modules belong to which processes. Via this partitioning it is possible to create several processes out of one single graph and thus communication between modules can be confined to the same process or can belong to two or more different processes. This allows the system to choose the appropriate communication protocol depending on inter-process or intra-process communication.

As parallel/distributed systems make intensive use of CPU time, it is a typical situation during execution of conventional systems that a task is waiting for data. In other words, it is a frequently occurring situation that parallel tasks can compute only if some data is available. One embodiment of the present invention provides for a data-driven paradigm to handle this type of behavior. Data driven systems can condition the execution of modules with the availability of the data that the modules require. One embodiment of the present invention facilitates implementation of the data-driven paradigm by inserting a standard pattern in the computing modules, which conditions the computation in dependency of the availability of the module's input data, and which facilitates an optimized utilization of available CPU resources.

Parallel/distributed applications require mechanisms to preserve shared data integrity. One embodiment of the present invention achieves shared data integrity by using data modules. Data Modules hold shared data that is to be exchanged between two or more connected modules. With the concept of Data Modules it is possible to easily identify data that requires synchronization and then to apply the appropriate synchronization mechanism. One skilled in the art will recognize that there are a number of common patterns available for synchronization. One embodiment of the present invention applies a suitable synchronization mechanism in data modules depending on the connected computing modules and on the parallelism level defined by the user through executors and process-instances.

The concepts of computing modules, data modules and link modules, in addition to enforcing modularization, facilitate implementation of monitoring capabilities in parallel/distributed system, which can be achieved by definition of a standard module format providing for the insertion of monitoring code into the modules. Such code can generate information related to the behavior of the module itself. According to one embodiment of the present invention, analysis tools may process this information in order to gain views of the running system which enable the user to test, debug and monitor a running system in an efficient way.

One embodiment of the present invention allows combination of one or more of the techniques discussed above in a single tool, thereby providing for a comprehensive and common philosophy for design, code development and execution modality of parallel/distributed systems.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION OF THE PREFERRED EMBODIMENTS

Figure 1:
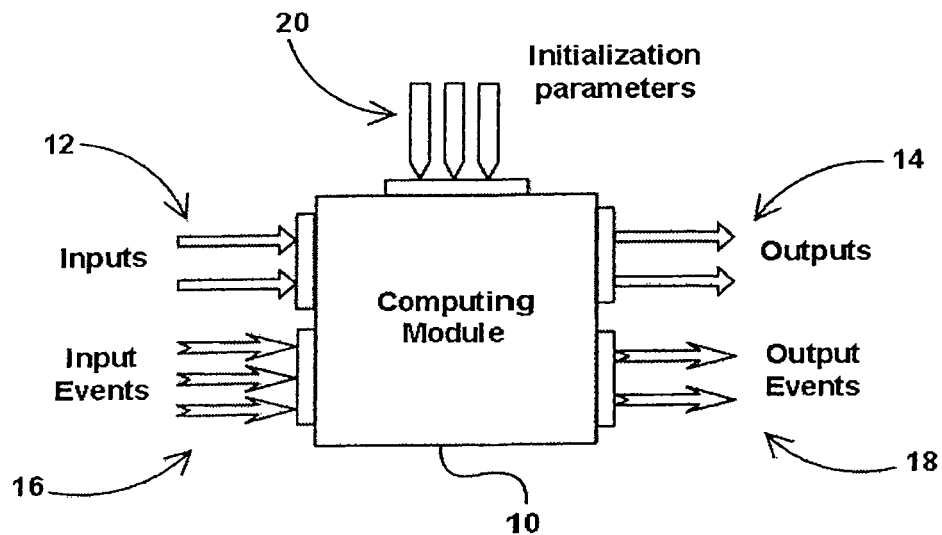
FIG. 1 shows a schematic view of a computing module, according to one embodiment of the present invention.

A preferred embodiment of the present invention is now described with reference to the figures where like reference numbers indicate identical or functionally similar elements.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

One embodiment of the present invention provides various techniques and tools to support the development of a parallel/distributed application.

Script Language

Parallel/distributed systems can be developed with the aid of a low level language in a form such as source code that hides the general structure of the system for a non-developer. The general structure can be stored in a number of design documents, diagrams or graphs that are maintained and updated during the development process. Properly aligning the design documents with the momentary development stage of the system is commonly a difficult task.

One embodiment of the present invention enables design of an application directly in a script form that can be used to define the design in a document format and at the same time can be used by the system for configuration purposes, to configure the modules, establish the connectivity of the application and to execute it.

Computing Modules

Parallel/distributed systems can be composed of several functions. These functions are usually assembled in a way that does not necessarily follow a modular design. The definition of computing modules according to one embodiment of the present invention leads to a modular design providing a clear distinction between the building blocks that perform the computations in a parallel/distributed system.

FIG. 1 shows an example computing module 10, which implements a particular function or functions of a parallel/distributed system, according to one embodiment of the present invention. According to one embodiment, computing module 10 provides a well-defined interface, comprising inputs 12, outputs 14, input events 16, output events 18 and initialization parameters 20. The inputs 12 identify input data for computing module 10, which can be defined with a specific type, such as read only. The outputs 14 identify output data that the computing module 10 writes, which can be with a defined type such as write only. The input events 16 identify signals that computing module 10 receives when certain events occur outside computing module 10. The output events 18 identify signals that computing module 10 sends when certain events occur inside computing module 10. The initialization parameters 20 identify initial values for the instantiation of computing module 10.

Inputs 12 and outputs 14 of computing module 10 can be connected to the appropriate type of data modules through a link module, as described further below. The input events 16 of computing module 10 are connected to output events of computing modules through a link module. The initialization parameters 20 represent the initial attributes of a specific module instance, such as computing module 10. Through these parameters it is possible to instantiate computing module 10 with different starting conditions.

Computing modules can in general be active or passive. Active modules perform their computation unconditionally, while passive module can perform their computation when some new input data is available, which is newer with respect to the last computation time. Therefore, one embodiment of the present invention allows the definition of a data-driven system, in contrast to a clock-driven system, which uses the available CPU resources more efficiently.

Data Modules

In parallel/distributed systems it is possible to identify data that is used to communicate results produced by one function to another. This data is usually globally defined in the system or locally in a function. The definition of data modules according to one embodiment of the present invention leads to a modular design enforcing a clear definition of the communication interface that the functions need in the system.

Figure 2:
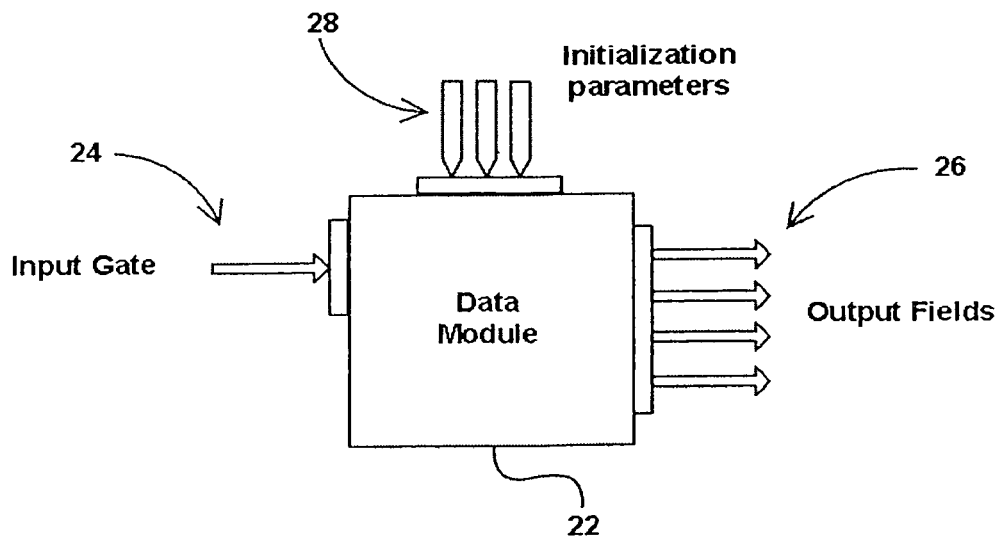
FIG. 2 shows a schematic view of a data module according to one embodiment of the present invention.

FIG. 2 illustrates a data module 22, which specifies a data type in a well-defined interface comprising input gate 24, output fields 26 and initialization parameters 28, according to one embodiment of the present invention. Input gate 24 identifies the entry point of the data that a computing module (not shown) uses to write new values (write). The output fields 26 identify the connection point/s where computing modules read the full data or part of it (read). The initialization parameters 28 identify initial values for the instantiation of the data module 22.

Input gate 24 of data module 22 can be connected to the output of a computing module with the same data type through a link module, as described further below. The output fields 26 can be connected to inputs of computing modules with the same data types through a link module. The initialization parameters 28 represent the initial attributes of a specified module instance, such as data module 22. Through these parameters it is possible to instantiate data module 22 with different starting conditions.

Link Modules

According to one embodiment of the present invention, in the design phase a system can be represented as a number of blocks interconnected by arrows, wherein link modules can encapsulate the concept of the arrows. This type of representation is highly modular and enables insights into the system at first glance. According to one embodiment of the present invention, link modules allow the system to define different types of communication channels depending on design requirements.

Figure 3:
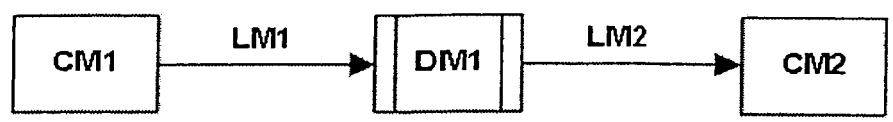
FIG. 3 shows a functional block diagram illustrating the interworking of computing modules, link modules, and a data module, according to one embodiment of the present invention.

FIG. 3 illustrates an example of the cooperation of computing modules CM1, CM2, a data module DM1 and link modules LM1, LM2 according to one embodiment of the present invention. The two computing modules CM1, CM2 are connected to data module DM1 via the link modules LM1 and LM2.

According to one embodiment of the present invention, all modules shown in FIG. 3 can belong to the same process. The communication of data from CM1 to DM1 and from DM1 to CM2 is performed by copying the output data from CM1 to DM1 and giving a pointer of this data to CM2. In other words, CM1, CM2 and DM1 can share the same memory space, wherein the link modules LM1 and LM2 can be of a local memory pointer link type.

According to another embodiment of the present invention, CM1 belongs to a machine M1 and CM2 belong to a machine M2, wherein machines M1 and M2 are not shown in FIG. 3. In this case the communication from CM1 to CM2 via DM1 can be performed using, for example, a network, wherein the link modules LM1 and LM2 are of a network link type.

According to one embodiment of the present invention, several types of link modules may be present in a system, each of them using different channels for data transport.

Executor/Process-Instance

Parallel/distributed systems should be designed and/or implemented to make efficient use of parallel computation facilities. Within a machine, parallel processes or parallel threads can be employed in order to make full use of the available hardware. The usage of processes and threads via executors and process-instances according to one embodiment of the present invention is described next.

According to one embodiment of the present invention, an executor groups a set of computing modules in one or more threads, executing them with a specific policy defined by the executor. Examples of executors include parallel executors, which assign one thread to each computing module; sequential executors, which execute all computing modules in the same thread in a sequence; chain executors, which execute all computing modules in the same thread in a sequence, but wherein execution is conditioned on the availability of data for the first module; once executors, which execute one step of the computation of the computing modules; and Step-ByStep executors, which allow user to execute one computing module at a time through an interactive session.

According to one embodiment of the present invention, a process-instance groups a set of executors into a single process. In this way it is easily possible to distribute an application over several machines.

According to one embodiment of the present invention, the abstraction concept of executors and process-instances removes from developers the need to manually code the usage of threads and processes. Moreover, in this way designers can determine and change at any time the parallelism level of a system without the need to develop it in the implementation code.

Data Buffering

According to one embodiment of the present invention, the aspect of data buffering is related to the handling synchronization of data between threads and machines. In the development and debugging phase of parallel/distributed systems, conventional techniques require much effort to be spent for handling synchronization and serialization of shared resources. Although some standard functions exist that support the handling of these aspects, usage of such functionalities is difficult and tedious. Many bugs in parallel/distributed systems are due to a non-appropriate usage of these conventional tools. One embodiment of the present invention provides a solution to this problem by the usage of double buffering techniques for handling data modules. According to one embodiment, each data module instantiates a list of buffers, wherein the list is used by the computing modules for writing and reading in a mutual exclusive way.

Figure 4A:
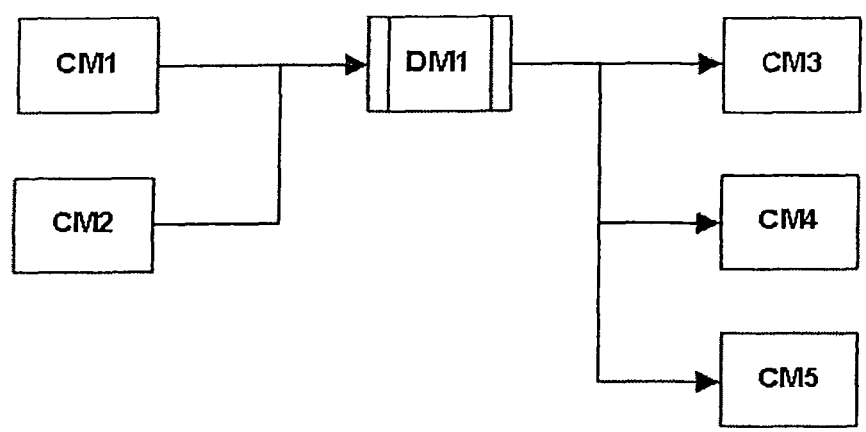
FIGS. 4a, 4b show functional block diagrams illustrating operation of data modules and computing modules for data access, according to one embodiment of the present invention.
Figure 4B:
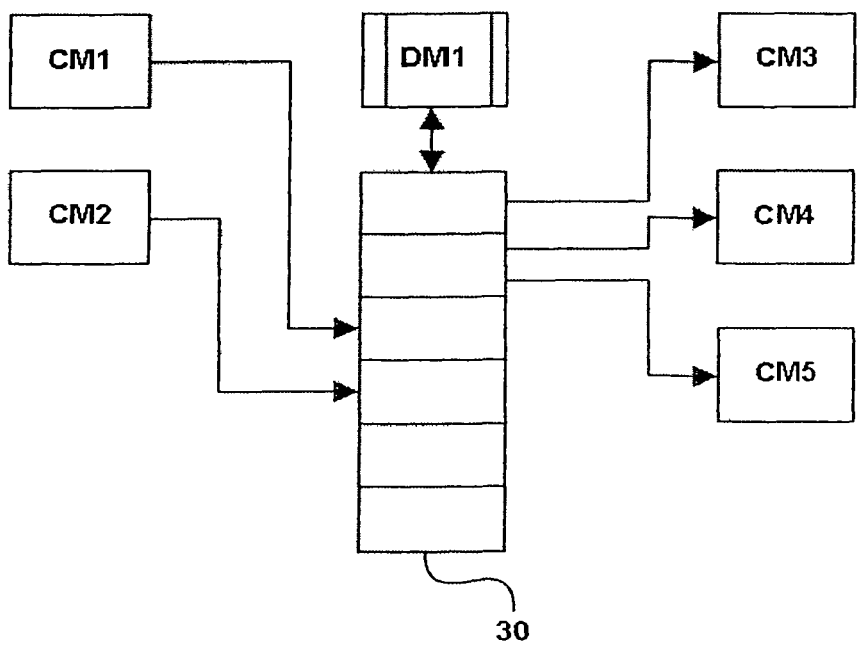

FIGS. 4a and 4b show functional block diagrams to illustrate data buffering according to one embodiment of the present invention. FIG. 4a shows an example application wherein two computing modules CM1, CM2 are connected with data module DM1 for the purpose of writing output data, and wherein three computing modules CM3, CM4, CM5 are connected with data module DM1 for the purpose of reading input data.

The double buffering technique as used in the example application of FIG. 4a is illustrated in detail in FIG. 4b, according to one embodiment of the present invention. The data module DM1 is associated with a buffer list 30. The buffer list 30 contains the effective data. A writer module, such as CM1 and CM2, owns a buffer for the next value to be published. When a writer module publishes a new value, it publishes the buffer and then takes a new buffer for the next value. A reading module, such as CM3, CM4, CM5, can read a published value from the buffer list 30.

With this approach it is possible to de-couple communication between modules such that synchronization is handled automatically, according to one embodiment of the present invention. Therefore, one embodiment of the present invention enables non-blocking communication because computing modules need not stop computation for communication issues. Moreover, the risk of deadlocks is eliminated according to one embodiment.

Monitoring

Monitoring a system allows developers and users to gain insight into system performance. Via monitoring it is possible to keep track of the behavior of parts of the system that determine its overall execution. Parallel/distributed systems belong to the applications which are conventionally most difficult to monitor. Due to parallel execution of the computations, the overall behavior is difficult to track. This problem is amplified in systems that are not designed following a modular paradigm where there is no concept of an overall scheme that users could refer to.

One embodiment of the present invention provides several abstraction levels of system monitoring, such as functionality level, wherein the functionality embedded into a computing module can produce monitoring data, showing what a functionality is doing; module level, wherein the modules, with their inputs and outputs, can be monitored in order to analyze local data flow; and system level, wherein the entire system can be monitored in order to extract a high level description of the overall behavior. One embodiment of the present invention enables various abstraction levels of system monitoring to be easily implemented, for example automatically implemented.

The following paragraphs describe one example of the way one embodiment of the present invention supports the development of parallel/distributed systems from the field of robotics. An example application that controls a robot by using of a number of sensors and effectors is described. The robot comprises sensors, including visual sensors such as a stereo camera set, audio sensors such as microphones, and tactile sensors such as force feedback skin sensors. The robot also comprises effectors, such as motors that control the position of subparts and the robot as a whole. According to one embodiment of the present invention, a robot application works as a control system that makes use of sensors and effectors in order to let the robot generate a well defined behavior.

Figure 5:
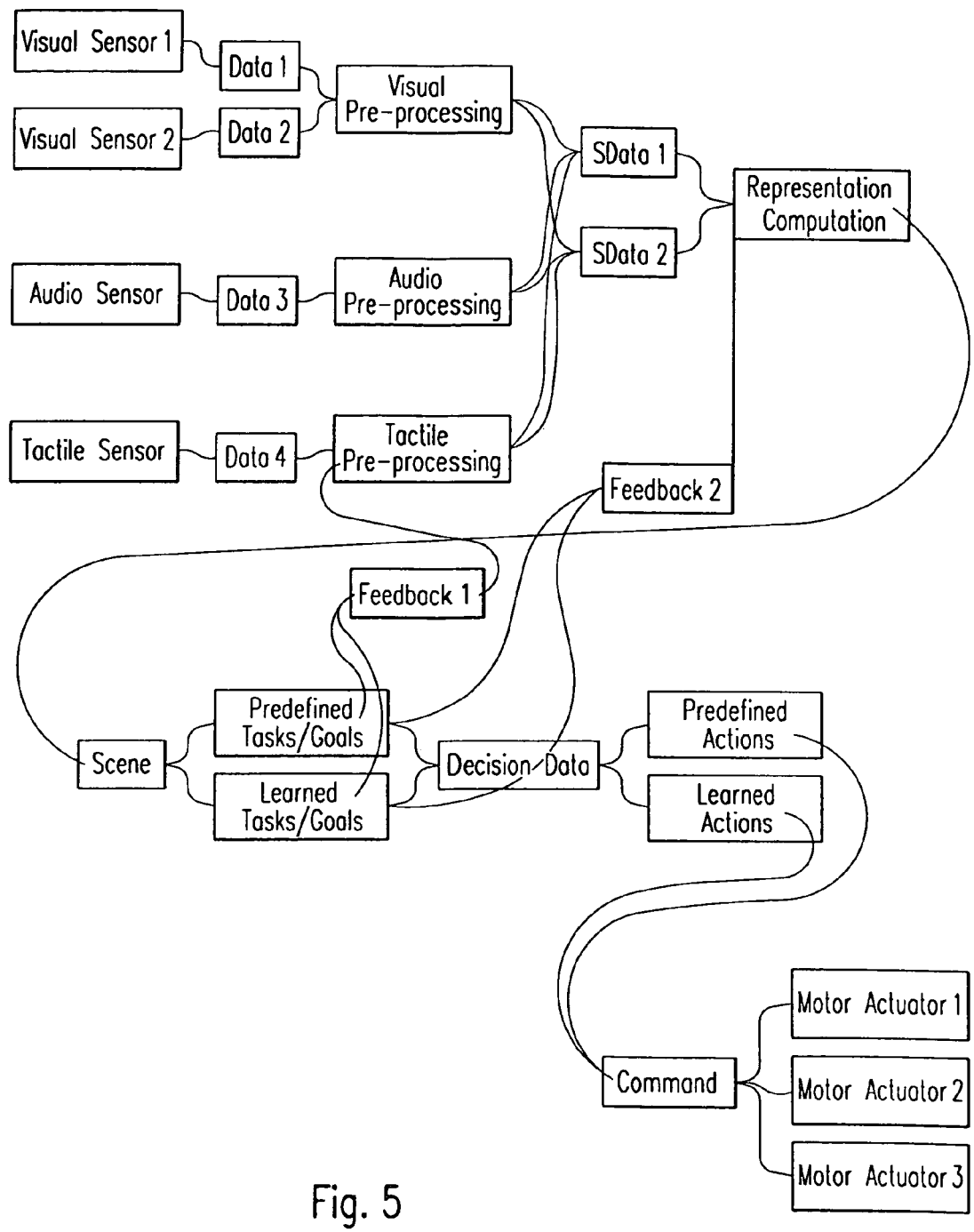
FIG. 5 shows a functional block diagram illustrating a robot control system according to one embodiment of the present invention.

FIG. 5 illustrates an exemplary robot control system according to one embodiment of the present invention. According to one embodiment, predefined modules can be used for the design. Computing and data modules are shown as rectangles and links as arrows interconnecting the modules.

According to one embodiment of the present invention, for the purposes of illustration the behavior of a robot can be modeled using the following modules:

Sensor modules, which represent the sensors present.

Pre-processing modules, in which input information for sensors is pre-processed in order to filter the signals and map the signals into the spatial map and object map (intermediate representation).

Representation computation module, in which semantic information is derived from the information taken from sensors; the output of this module is a scene/situation representation.

Task/Goals modules, in which the possible tasks that the robot can perform are modeled, and goals to be achieved by these tasks are modeled. Therefore, an autonomous robot can be created that is able to make decisions independently of the environment. Feedback can be used to shape representation coming from the earlier processing stages.

Actions Modules, which define how a task should be executed by the robot. These modules can prepare the planning of an action and create the sequence of sub-actions that are to be executed in order to perform a task. The output of these modules can be a sequence of commands that should be executed by the actuator.

Actuators Modules, which represent the actuators present.

The aspects described so far constitute part of the high level design of an example robot control system according to one embodiment of the present invention. Next, the interfaces of computing modules and data modules and the type of each link and execution patterns for the system are described.

Figure 6:
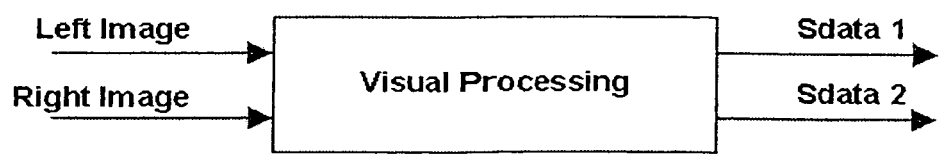
FIG. 6 shows the interface to the visual processing module depicted in FIG. 5, according to one embodiment of the present invention.

One example module is the visual processing module. FIG. 5 shows that this module has two inputs and two outputs according to one embodiment of the present invention. The resulting interface for this module according to one embodiment of the present invention is shown in FIG. 6. For example, the figures illustrate views generated on a display of a computer system by a development tool implementing one embodiment of the present invention. In addition to defining the interface of each module, the links and execution patterns are specified. The definition of the links concerns the type of communication between modules. According to one embodiment of the present invention, a standard memory communication link type can be established for communication between modules that are executed on the same machine. According to one embodiment of the present invention, a dedicated network link type can be established for connections across machines.

A further design decision concerns the execution pattern, which can be determined by the designer via the choice of the type of executors and the association of the modules. Thus the designer, supported by the development tool according to one embodiment of the present invention, can create in a simple, fast and efficient way the required threads and can determine the synchronization during execution.

Figure 7:
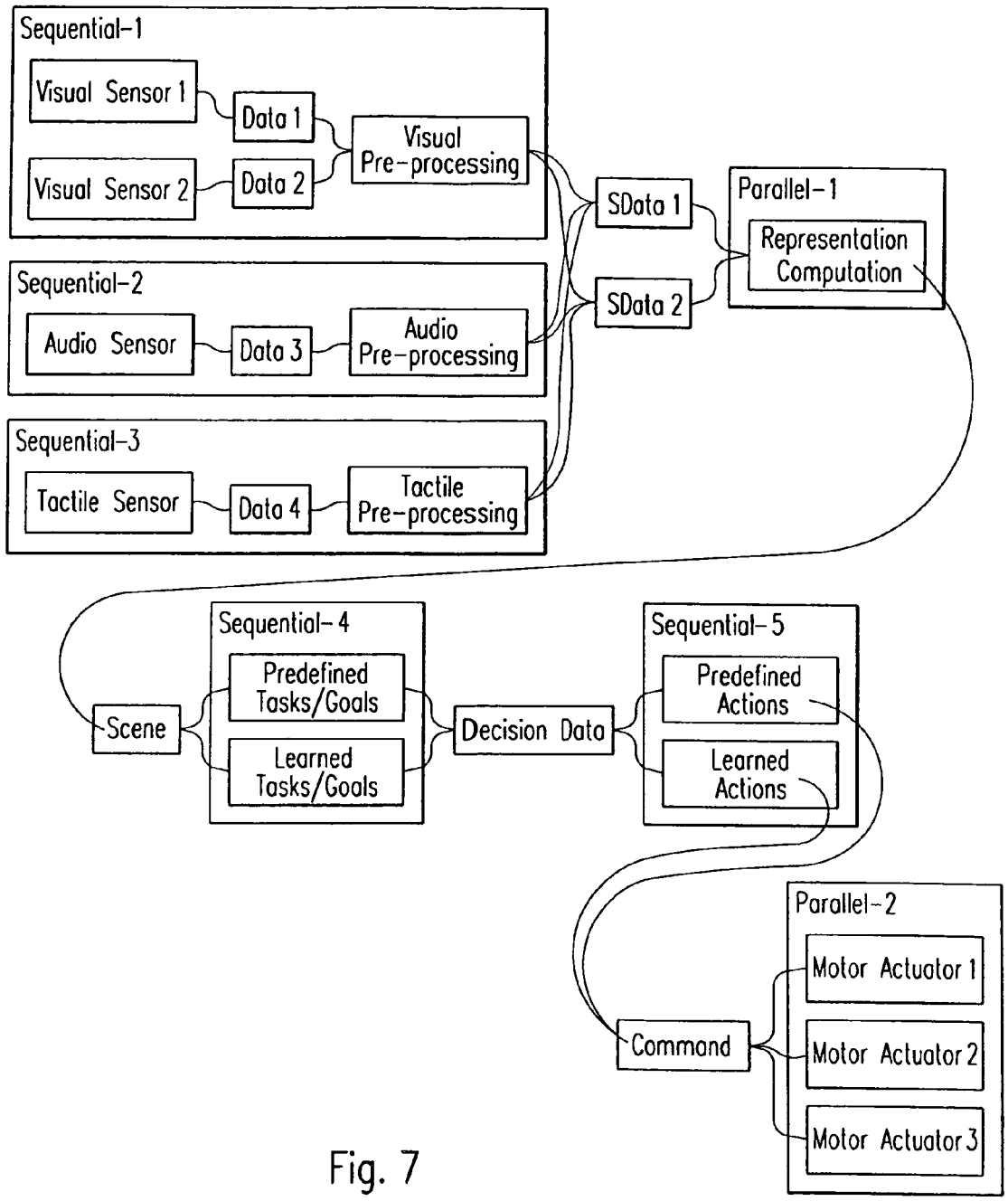
FIG. 7 shows a schematic illustration of an execution pattern for the system depicted in FIG. 5, according to one embodiment of the present invention.

An exemplary execution pattern for the robot control system of FIG. 5 is shown in FIG. 7. Feedback connections are not shown for reasons of clarity. According to one embodiment of the present invention, in this graph modules have been grouped using parallel and sequential executors, wherein a parallel executor creates one thread for each module contained in the executor, and a sequential executor creates one thread in which modules are executed in a sequential fashion.

Figure 8:
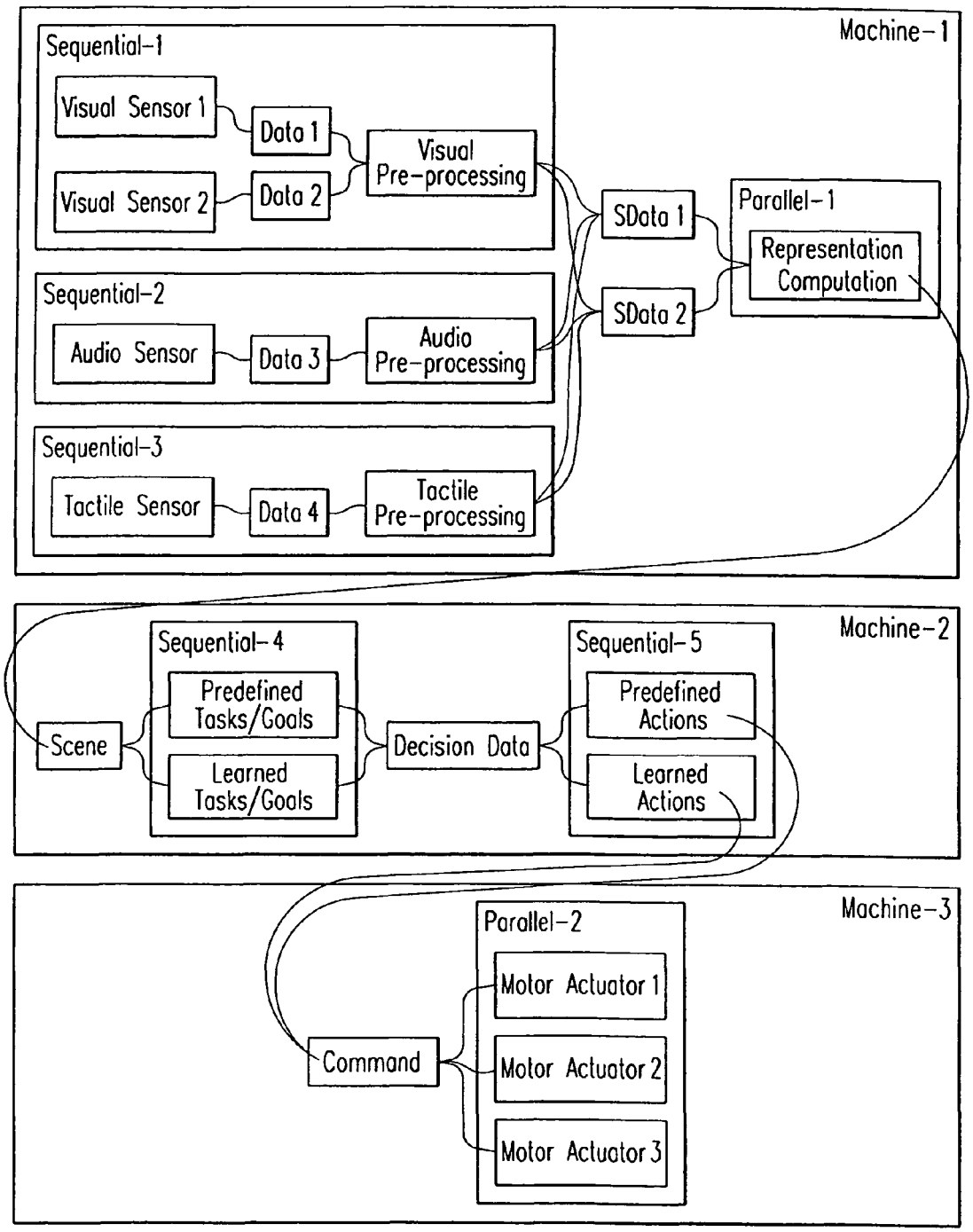
FIG. 8 shows a schematic illustration of a partition of the system of FIGS. 5, 7 onto various machines, according to one embodiment of the present invention.
Figure 9:
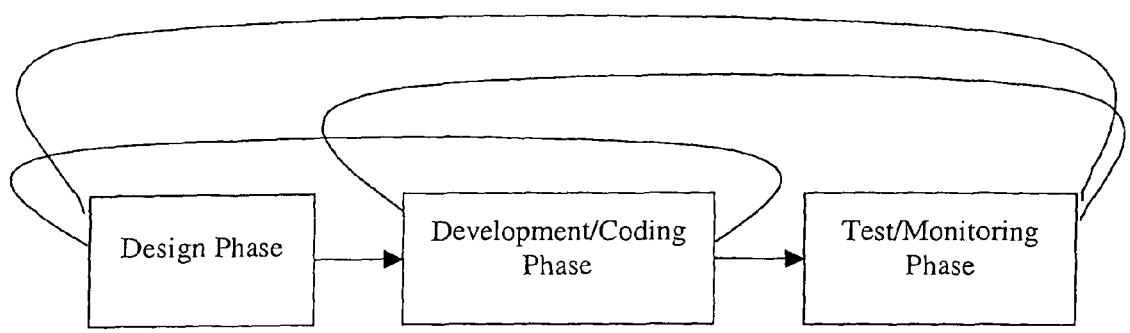
FIG. 9 a conventional design process used in application development.

A further design decision concerns the subdivision of the system for execution on several machines. For the example system described herein, one embodiment of the present invention assigns one machine to each executor. This is illustrated in FIG. 8 according to one embodiment of the present invention. Feedback connections have again been omitted for clarity.

According to one embodiment of the present invention, the assignment of modules to executors and machines shown in FIG. 8 is only one possible choice and other useful combinations are possible. One embodiment of the present invention allows for flexible re-assignment of executors and machines for achieving any required synchronization pattern or incorporating load balancing aspects.

One skilled in art will recognize that module's granularity is a design meter for the user application. But this factor can also be taken in account during implementation of the development tool or environment according to one embodiment of the present invention. This is because, according to one embodiment of the present invention, a user application can own any combination of the following aspects: small data size for data modules; large data size for data modules; light computation for computing modules; and heavy computation for computing modules.

One embodiment of the present invention allows simplification of the design phase, the development and the test phase of parallel/distributed systems. One embodiment of the present invention provides a development tool that achieves the following advantages: the design of a parallel/distributed system is combined with the actual implementation, thereby enforcing modularity; the implementation of common functionality required for parallel/distributed systems is automated; testing and monitoring of the system is simplified.

One embodiment of the present invention supports the design and creation of parallel/distributed applications. The creation of such applications requires handling of problems such as design coherency, synchronization, data communication, computation consistency and many more. Such problems appear in conventional applications comprising parallel/distributed systems, robot applications and real-time systems.

With respect to parallel/distributed systems, one embodiment of the present invention advantageously enables the flexibility of modular design by using the concepts of data modules, computing modules and link modules; the automatic handling of data communication and synchronization between modules and many features for handling parallelism within one machine or between machines by using the concepts of executor and process-instances.

With respect to robot applications, one embodiment of the present invention advantageously enables the ability to build systems with modules that may have a user defined granularity; the automatic handling of data communication between modules that simplify the integration of large robot systems in one single environment; the ability to configure and modify the architecture of the robot system by a simple script definition file; and high performance data communication by using the concept of data buffering.

With respect to real-time systems, one embodiment of the present invention offers the following advantages: the flexibility of modular design by using the concepts of data modules, computing modules and link modules; and the ability to hold computation determinism by a predefined pattern for handling communication between modules and computation within each module.

One embodiment of the present invention allows one to modularize the structure of a parallel/distributed system to be developed, where data, functions and links are clearly separated, via the definition of computing modules, data modules and link modules.

One embodiment of the present invention provides a data-driven system in a parallel environment developed via the definition of a connectivity graph that represents the data pathways triggering the execution events.

One embodiment of the present invention enables handling of data communication between modules automatically with respect to synchronization and non-blocking communication. By synchronization, according to one embodiment, automatic handling of data sharing between different threads/processes is achieved. By enabling non-blocking communication, one embodiment of the present invention allows each computing module of the system to generate new outputs and immediately continue the computation, regardless of the status of the reader modules for these outputs. According to one embodiment, these two features in combination prevent the occurrence of system deadlocks at the communication level, thereby overcoming the communication dependency of conventional parallel/distributed systems.

One embodiment of the present invention allows simplification of the handling and definition of communication channels through the concept of link modules. One embodiment of the present invention allows the user to assign in a simple and transparent way threads and processes to computing modules. This feature implies a drastic reduction of the workload for system designers/developers, eliminating a strong dependency between computation and parallelization.

One embodiment of the present invention provides for an advantageous combination of the expressivity power of script languages and re-configurability with the usage of a simple script language for the definition of the graph connectivity of the user application. With the usage of this simple script language and the employment of modularization, one embodiment of the present invention attaches importance to the design phase of a system, removing or minimizing the gap between design and development.

The present invention may be embodied in various forms and should not be construed as limited to the embodiments set forth herein. Rather, these embodiments are provided so that disclosure will be thorough and complete and will fully convey the invention to those skilled in the art. Further, the apparatus and methods described are not limited to rigid bodies.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without department from the spirit and scope of the invention as it is defined in the appended claims.

What is claimed is:

1. A computer-implemented method for developing a parallel/distributed application, the method comprising:
    designing the parallel/distributed application using a script language for representing one or more elements of a connectivity graph and connectivity between the one or more elements;
    implementing the designed parallel/distributed application including
        implementing in a computing module one or more functional blocks that perform the computation of the parallel/distributed application, each computing module receiving at least one of input data, input events, or initialization parameters, and generating at least one of output data or output events,
        buffering shared data in a data module which is at least one of used by at least two computing modules or exchanged between at least two computing modules, each data module having an input gate, output fields, and initialization parameters, the buffering comprising instantiating in the data module a list of buffers providing write and read memory for the computing modules connected to the data module, wherein only a first computing module of the plurality of computing modules associated with the data module owns a buffer in the list for a first value to be published, and wherein the first computing module is the only computing module configured to publish the buffer with the first value;
        connecting computing modules and data modules with link modules, with at least one link module implementing a communication protocol; and
        defining a type of execution for the computing modules by grouping the one or more computing modules in one or more threads using one or more predefined executors;
        distributing the parallel/distributed application over one or more computing devices by grouping a set of executors in a single process using one or more predefined process-instances; and
        monitoring and testing the implemented parallel/distributed application using one or more abstraction levels from the group of a functionality level, a module level, and a system level.

2. The method of claim 1, further comprising processing the connectivity graph based on the script language in the implementation phase to define and configure one or more particular modules based on the one or more predefined modules and to define connectivity of the one or more particular modules.

3. The method of claim 1, further comprising one or more passive computing modules that perform computations when new input data is available.

4. The method of claim 1, wherein a data module of the one or more data modules comprises data of a specific data type.

5. The method of claim 1, further comprising:
    identifying data requiring synchronization; and
    applying an appropriate synchronization mechanism for the one or more data modules.

6. The method of claim 1, wherein the communication protocol of the at least one link module is one from the group of link types comprising:
    local memory pointer link type, for connecting modules belonging to a common process; and
    network link type, for connecting modules via a network.

7. The method of claim 1, wherein an executor groups one or more computing modules in one or more threads.

8. The method of claim 7, wherein the executor represents a pattern of execution for assigned modules.

9. The method of claim 8, wherein the executor relates to a type of execution pattern of the group of patterns comprising:
    parallel execution, wherein each module has its own thread;
    sequential execution, wherein one or more modules are executed sequentially in a thread;
    one step execution, wherein only one step of execution of one or more modules is performed;
    chain execution, wherein one or more computing modules of a thread are executed sequentially depending on availability of data for a first module in a chain; or
    step-by-step execution, wherein one computing module at a time is executed.

10. The method of claim 1, wherein a process-instance comprises an assignment of one or more modules to a process.

11. The method of claim 1, wherein a computing module of the one or more computing modules is assigned to a process-instance.

12. The method of claim 1, wherein the implementation phase further comprises grouping the one or more executors into a single process as one process-instance.

13. The method of claim 1, wherein at least one of the one or more predefined modules comprises a monitoring code for monitoring functionality implemented by the module.

14. The method of claim 1, wherein at least one of the one or more predefined abstraction levels comprises a functionality level, where at least one module generates monitoring data related to functionality of the module.

15. The method of claim 1, wherein at least one of the one or more predefined abstraction levels comprises a module level, where input and output of at least one module is monitored to analyze data flow related to the module.

16. The method of claim 1, wherein at least one of the one or more predefined abstraction levels comprises a system level for monitoring the parallel/distributed application.

17. The method of claim 1, wherein the script language is used to execute the parallel/distributed application.

18. The method of claim 1, wherein the method is used to develop a control system for a robot.

19. The method of claim 1, wherein each computing module is assigned to one executor.

20. The method of claim 1, further comprising the steps of connecting the output fields of a data module to at least one computing module.

21. The method of claim 1, further comprising the steps of connecting the input gate of a data module to at least one computing module.

22. The method of claim 1, wherein the first computing module that owns the buffer in the list for the first value to be published is further configured to
publish the buffer with the first value; and
take a new buffer for a next value.

23. The method of claim 1, wherein a second computing module of the one or more computing modules associated with the data module is further configured to read the first from the buffer list.

24. A computer-implemented method for implementing a parallel/distributed application, the method comprising:
implementing in a plurality of computing modules one or more functional blocks that perform the computation of the parallel/distributed application, each computing module receiving at least one of input data, input events, or initialization parameters, and generating at least one of output data or output events;
buffering shared data in a data module which is at least one of used by at least two computing modules or exchanged between at least two computing modules, each data module having an input gate, output fields, and initialization parameters;
connecting computing modules and data modules with link modules, with at least one link module implementing a communication protocol;
instantiating in a data module a list of buffers providing write and read memory for the computing modules connected to the data module, wherein only a first computing module of the plurality of computing modules associated with the data module owns a buffer in the list for a first value to be published, and wherein the first computing module is the only computing module configured to publish the buffer with the first value, and wherein a second computing module of the plurality of computing modules associated with the data module is configured to read the first value from the buffer list;
defining a type of execution for the computing modules by grouping the one or more computing modules in one or more threads using one or more predefined executors;
distributing the parallel/distributed application over one or more computing devices; and
monitoring and testing the implemented parallel/distributed application using one or more abstraction levels from the group of a functionality level, a module level, and a system level.

25. A computer program product embodied on a non-transitory computer readable medium which when executed by a computer performs a computer-implemented method for developing a parallel/distributed application, comprising:
designing the parallel/distributed application using a script language for representing one or more elements of a connectivity graph and connectivity between the one or more elements;
implementing the designed parallel/distributed application including
implementing in a computing module one or more functional blocks that perform the computation of the parallel/distributed application, each computing module receiving at least one of input data, input events, or initialization parameters, and generating at least one of output data or output events,
buffering shared data in a data module which is at least one of used by at least two computing modules or exchanged between at least two computing modules, each data module having an input gate, output fields, and initialization parameters, the buffering comprising instantiating in the data module a list of buffers providing write and read memory for the computing modules connected to the data module, wherein only a first computing module of the plurality of computing modules associated with the data module owns a buffer in the list for a first value to be published, and wherein the first computing module is the only computing module configured to publish the buffer with the first value;
connecting computing modules and data modules with link modules, with at least one link module implementing a communication protocol; and
defining a type of execution for the computing modules by grouping the one or more computing modules in one or more threads using one or more predefined executors;
distributing the parallel/distributed application over one or more computing devices by grouping a set of executors in a single process using one or more predefined process-instances; and
monitoring and testing the implemented parallel/distributed application using one or more abstraction levels from the group of a functionality level, a module level, and a system level.

* * * * *